Figure 1:
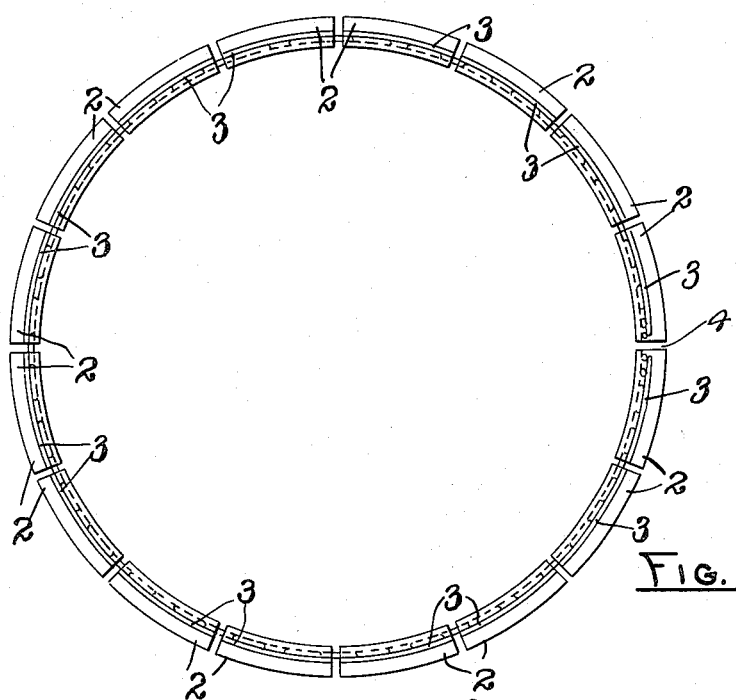

Jan. 16, 1951     T. E. McFALL     2,538,649

PISTON RING

Filed July 14, 1947

INVENTOR
THURLOW E. McFALL
BY Liverance and
Van Antwerp
ATTORNEYS

Patented Jan. 16, 1951

2,538,649

UNITED STATES PATENT OFFICE 2,538,649

PISTON RING

Thurlow E. McFall, Sparta, Mich., assignor to Muskegon Piston Ring Company, Muskegon, Mich., a corporation of Michigan Application July 14, 1947, Serial No. 760,741

4 Claims. (Cl. 309—45)

This invention is concerned with piston rings which are usable, in general, in the lower groove or grooves of a piston for oil saving. In the lower groove or grooves of a piston, as high a temperature is not met with as in the upper groove where a compression piston ring of cast iron is ordinarily used. But in the lower or oil groove of a piston, and sometimes in more than one of the lower grooves thereof, piston rings of steel, light in weight, are or may be used for scraping excess oil from cylinder walls and draining it from the bottom of a ring groove through a piston back to the engine crankcase.

It is an object and purpose of the present invention to provide a piston ring which is circumferentially extendable so that when in a free condition, the inner diameter of the ring is sufficient that the ring may pass over a piston to reach the ring groove in which it is to be installed, and after reaching said groove, when the piston with the ring is placed within the confines of a cylinder, the ring is circumferentially decreased in length and substantially closed at all radial gaps therein, providing a piston ring having an oil collecting annular groove at its outer side for reception of oil which may be drained through the ring into the piston ring groove and thence to the crankcase. At the same time the ring which is made up of a relatively large number of arcuate segments, has each of said segments pressed outwardly at its outer curved bearing surfaces against the cylinder wall, and because of a measure of independent action or movement of each segment with respect to the others, the ring conforms to the cylinder wall even though it may be worn and not have a perfectly circular form. Moreover the ring may be made up of a plurality of segments and one continuous spring member, preferably of a wire rod of resilient steel, which is formed with alternate consecutive U-shaped loops from one end to the other, the two ends of the spring being anchored on two end segments between which there is an open parting.

Furthermore, in my invention, very simple, economical and effective means may be used for retaining the spring member in the continuous groove formed around the piston ring by the plurality of ring segments, each of which is preferably of channel form in cross section. With such invention the ring segments may be made of a required thickness or gauge of metal, independent of the degree or extent of the spring force which acts upon them. And, of course, the spring member may be of a greater or less strength as desired, independent of the gauge of metal used for the ring segments.

It is an object and purpose of the present invention to provide a piston ring having the characteristics and qualities stated and which is very readily and economically manufactured, and will serve the purposes for which it is designed in an exceptionally satisfactory manner.

Figure 2:
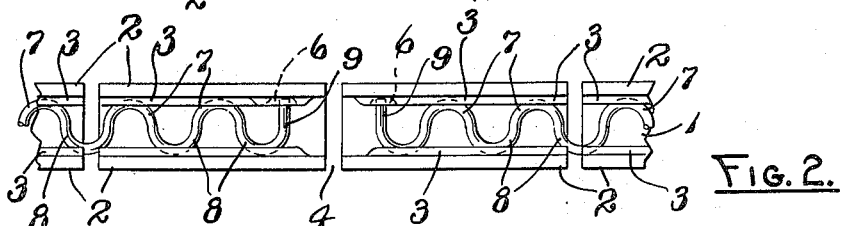
Figure 3:
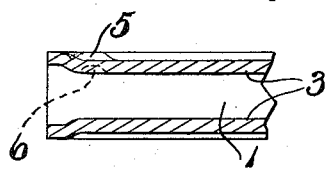
Figure 4:
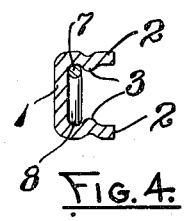
Figure 7:
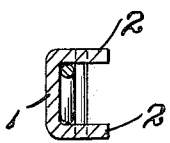
Figure 5:
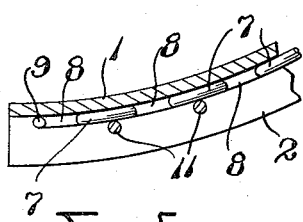
Figure 6:
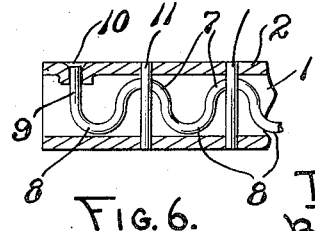

An understanding of the invention may be had from the following description, taken in connection with the accompanying drawing, in which, Fig. 1 is a plan of the assembled and completed piston ring made in accordance with my invention, Fig. 2 is a fragmentary, somewhat enlarged elevation of the ring at the open parting between the two end segments thereof, Fig. 3 is a fragmentary longitudinal section through one of said end segments, Fig. 4 is a transverse vertical section through the ring at one of the segments thereof, Fig. 5 is a fragmentary horizontal longitudinal section through the end ring segment of a slightly modified form of structure, Fig. 6 is a similar longitudinal vertical section, and Fig. 7 is a transverse vertical section through the structure shown in Figs. 5 and 6.

Like reference characters refer to like parts in the different figures of the drawing.

In the embodiment of the invention shown in Figs. 1 to 4 inclusive, the ring is to be made up of a number or plurality of arc-shaped ring segments from flat metal, shaped into channel form, having an inner vertical web 1 and outwardly extending upper and lower flanges 2. The plurality of segments when located in successive end to end relation comprise a circular ring and the outer edges of the flanges 2 provide circular peripheral bearing edges to press against a cylinder wall. The flanges 2 of all of the ring sections, except the two end sections, are longitudinally grooved and pressed inwardly toward each other a short distance outward from the web 1, providing beads 3 (Fig. 4), between which and the webs 1 are grooves forming seats for the spring member hereafter to be described.

The two end sections, that is, one at each side of the open parting 4 at one side of the ring, are modified slightly in structure. The beads 3 do not extend fully to the ends of the sections which are separated by the open parting 4, but terminate a short distance therefrom, and the metal is pressed upwardly at 5 so as to provide a socket 6 indicated in dotted lines in Fig. 3 in one of the flanges 2, preferably the upper one.

The spring member is of a continuous length of wire rod as shown, which is formed into a successive series of alternate U-bends 7 and 8, as shown in Fig. 2. The ends of the spring member terminate in legs 9 which seat in the sockets or recesses at 6, one at each side of the open parting 4. The upper series of U-bends 7 are located back of or within the upper ribs 3 of the upper flanges 2 of the successive sections. The lower bends 8 are located back of the lower ribs 3. This securely connects the spring member to all of the ring sections and said spring member operates as a continuous connecting means for the several ring sections, which do not separate from each other except at gaps between adjacent ends when the assembled ring is in a free, uncontracted condition.

In Figs. 5, 6 and 7, the flanges 2 and 3 are not provided with the ribs 3 as in the first structure, and an opening 10 in the upper flange 2 of each of the end sections of the ring, one at each side of the open parting 4 is made, as shown in Fig. 6, to receive the vertical end portions 9 of the spring member. To hold the spring member in place vertical pins 11 are disposed between the flanges 2 of the ring sections, immediately outside the springs so as to hold them substantially in engagement against the webs 1, effecting the same result as in the first described structure.

When the piston ring is to be used in service, it is placed over a piston and brought to the ring groove which is to receive it. When the ring is contracted to conform to the interior diameter of a cylinder, the adjacent ends of the successive ring sections are brought closely together. The spring member at the alternate U-bends 7 and 8 therein is strained to permit a shortening in length of the spring member, less than the length that it has when in a free uncontracted position. This provides a resilient force in the spring member which tends to separate the ring sections at their ends and therefore force them outwardly to bear at the outer edges of the flanges 2 against a cylinder wall with desired pressure, the extent of which may be controlled by the cross section of the spring, the material of which it is made, and the amount of contraction which the ring has when it is within a cylinder wall. Each ring section is free for a limited independent movement with respect to the others, so that the ring as a whole may take shapes to continually conform to the cylinder wall in its variations in the length thereof.

It is of course to be understood that while not shown, the web portions 1 of the ring sections may have oil passing openings therethrough. Also, while the spring member is disclosed of wire rod material, other cross sections of the spring material may be used and the invention is not limited to a spring rod having a circular cross section, but may be replaced by other equivalent spring structures effecting the same functions in the same way.

The invention is defined in the appended claims and is to be considered comprehensive of all forms of structure coming within their scope.

I claim:

1. A piston ring comprising, a plurality of arcuate segments located in successive alinement substantially in a circle, an elongated spring expander member of a length of spring material corrugated to provide alternate axially positioned U-shaped loops, means for slidably connecting said ring sections to said expander member, said sections being normally spaced from each other at adjacent ends when the spring expander member is free and unrestrained, and said spring member being circumferentially contractible on bringing adjacent ends of successive ring sections substantially together.

2. A structure as defined in claim 1, said ring having an open parting at one side, and means for anchoring the ends of the spring expander member on two ring sections located one at each side of said parting.

3. A piston ring comprising, a plurality of arcuate ring sections disposed in alined end to end relation to provide a circular ring when adjacent ends of successive sections are substantially together, each of said sections being of sheet metal and of channel form, having a vertical web and upper and lower outwardly extending horizontal flanges, and each of said flanges longitudinally thereof having a rib, the ribs on the flanges of a section extending toward each other, and a spring expander member of a single length of spring material, having alternate vertical U-shaped loops therein located between the flanges of said ring sections with the corrugations of the spring expander member extending between said flanges, and located between the webs of said ring sections and the ribs on the flanges thereof.

4. A construction as defined in claim 3, the ends of said spring expander member being spaced short distances from each other, and means for anchoring said ends upon two successive ring sections, between adjacent ends of which the ring has an open parting.

THURLOW E. McFALL.

REFERENCES CITED

The following references are of record in the file of this patent:

UNITED STATES PATENTS

| Number | Name | Date |
|---|---|---|
| 1,918,707 | Mellor | July 18, 1933 |
| 2,239,703 | Crawford | Apr. 29, 1941 |
| 2,280,744 | Bowers | Apr. 21, 1942 |
| 2,319,097 | Zahodiakin | May 11, 1943 |
| 2,319,098 | Zahodiakin | May 11, 1943 |
| 2,346,897 | Bowers | Apr. 18, 1944 |
| 2,355,772 | Zahodiakin | Aug. 15, 1944 |
| 2,439,546 | McFall | Apr. 13, 1948 |